(12) United States Patent
Kikuchi et al.

(10) Patent No.: US 6,495,936 B2
(45) Date of Patent: Dec. 17, 2002

(54) ROTATING ELECTRICAL MACHINE

(75) Inventors: Toshio Kikuchi, Yokosuka (JP);
Shinichiro Kitada, Tokyo (JP); Yutaro Kaneko, Yokohama (JP); Takashi Tsuneyoshi, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/058,118

(22) Filed: Jan. 29, 2002

(65) Prior Publication Data

US 2002/0130573 A1 Sep. 19, 2002

(30) Foreign Application Priority Data

Mar. 14, 2001 (JP) ........................................ 2001-071555
Jun. 21, 2001 (JP) ........................................ 2001-187588

(51) Int. Cl.$^7$ ................................................ H02K 9/02
(52) U.S. Cl. ........................................ 310/58; 310/254
(58) Field of Search ........................ 310/58, 54, 52, 310/215, 57, 89, 254, 258, 259, 60 R, 60 A, 214, 217

(56) References Cited

U.S. PATENT DOCUMENTS 4,994,700 A  *  2/1991  Bansal et al. ............... 310/215
5,317,224 A  *  5/1994  Ragaly ........................ 310/58
5,670,838 A  *  9/1997  Everton ...................... 310/254

FOREIGN PATENT DOCUMENTS

JP          4-364343       12/1992     ................ 310/54

* cited by examiner

Primary Examiner—Nestor Ramirez
Assistant Examiner—Nguyen Hanh
(74) Attorney, Agent, or Firm—Foley & Lardner

(57) ABSTRACT

This invention prevents leakage of cooling medium from a cooling passage in the interior section of a slot of a stator. Coils are housed in the slot of the stator core. The openings of the slot are covered in order to form a cooling passage in the slot. An end plate is disposed on the end of the stator. The stator core and the end plate are integrated by winding coils through the outer side of the end plate. A cylindrical member which projects along the inner peripheral face of the stator from the end of the stator is formed by resin molding to be integrated with a section of the end plate. A ring-shaped space which introduces cooling medium is formed on an outer peripheral side of the cylindrical member and is connected with the cooling passage.

10 Claims, 18 Drawing Sheets

ND OF THE INVENTION

This invention relates to a rotating electrical machine (a motor or a generator, or a motor/generator) which has a cooling mechanism.

BACKGROUND OF THE INVENTION

Tokkai Hei 4-364343 published by the Japanese Patent Office in 1992 discloses a rotating electrical machine which uses an inner section of a slot of a stator as a cooling passage. In this rotating electrical machine, components which generate heat such as the stator coils or the stator can be directly cooled by coming into direct contact with a cooling medium, for example a cooling oil, which flows in the slot. When forming the cooling passage, a mold is disposed in the inner section of the slot and on the inner periphery of the stator. A resinous material is injected in order to fill the space defined by the stator core and the mold. The resinous material hardens and covers the slot opening.

SUMMARY OF THE INVENTION

Since the conventional example of a rotating electrical machine displays poor sealing characteristics between the stator core and the resinous material, the cooling medium may leak from the juncture of the stator core with the resinous material. Leakage of cooling medium from the inner peripheral surface of the stator towards the rotor increases friction during rotation of the rotor and therefore adversely affects the rotating efficiency of the rotating electric machine.

It is therefore an object of this invention to improve the sealing characteristics of the resinous material with respect to the stator core.

In order to achieve above object, this invention provides a rotating electric machine comprising: a rotor; a stator including a stator core having teeth, a coil being wound around each of the teeth, a slot formed between adjacent teeth, and an end plate being disposed on the end of the stator core and made from a material which is different from the magnetic material constituting the stator core; the end plate being integrally joined with the stator core by winding the coil through the outer side of the end plate; a case for housing the rotor and the stator; and a cylindrical member which projects along the inner peripheral surface of the stator from the end plate; the cylindrical member being formed by a resinous material to be integrated with a section of the end plate.

In the rotating electric machine, a cooling passage is formed in the slot by a closing plate for closing the slot opening and a ring-shaped space for introducing a cooling medium is defined by the outer peripheral side of the cylindrical member, an end face of the stator, and the case; the ring-shaped space being connected to the cooling passage.

The details as well as other features and advantages of this invention are set forth in the remainder of the specification and are shown in the accompanying drawings.

BRIEF DESCRIPTION OF THE DRAWINGS

FIG. 5 shows the divided core in a coiled configuration, wherein

FIG. 8 is a partial sectional view of a stator core to which a mold is set during manufacturing of cylindrical member, wherein

FIG. 9 is a partial sectional view of a stator after resin molding, wherein

FIG. 10 shows a detail of an end plate, wherein

FIG. 12 shows a detail of an end plate according to the second embodiment of this invention, wherein

FIG. 14 partially shows a coiled divided core according to a third embodiment, wherein

FIG. 15 is a partial sectional view of a stator to which a mold is set during manufacturing of cylindrical member, wherein

FIG. 16 shows an end plate according to a fourth embodiment of this invention, wherein

DESCRIPTION OF THE PREFERRED EMBODIMENTS

Figure 1:
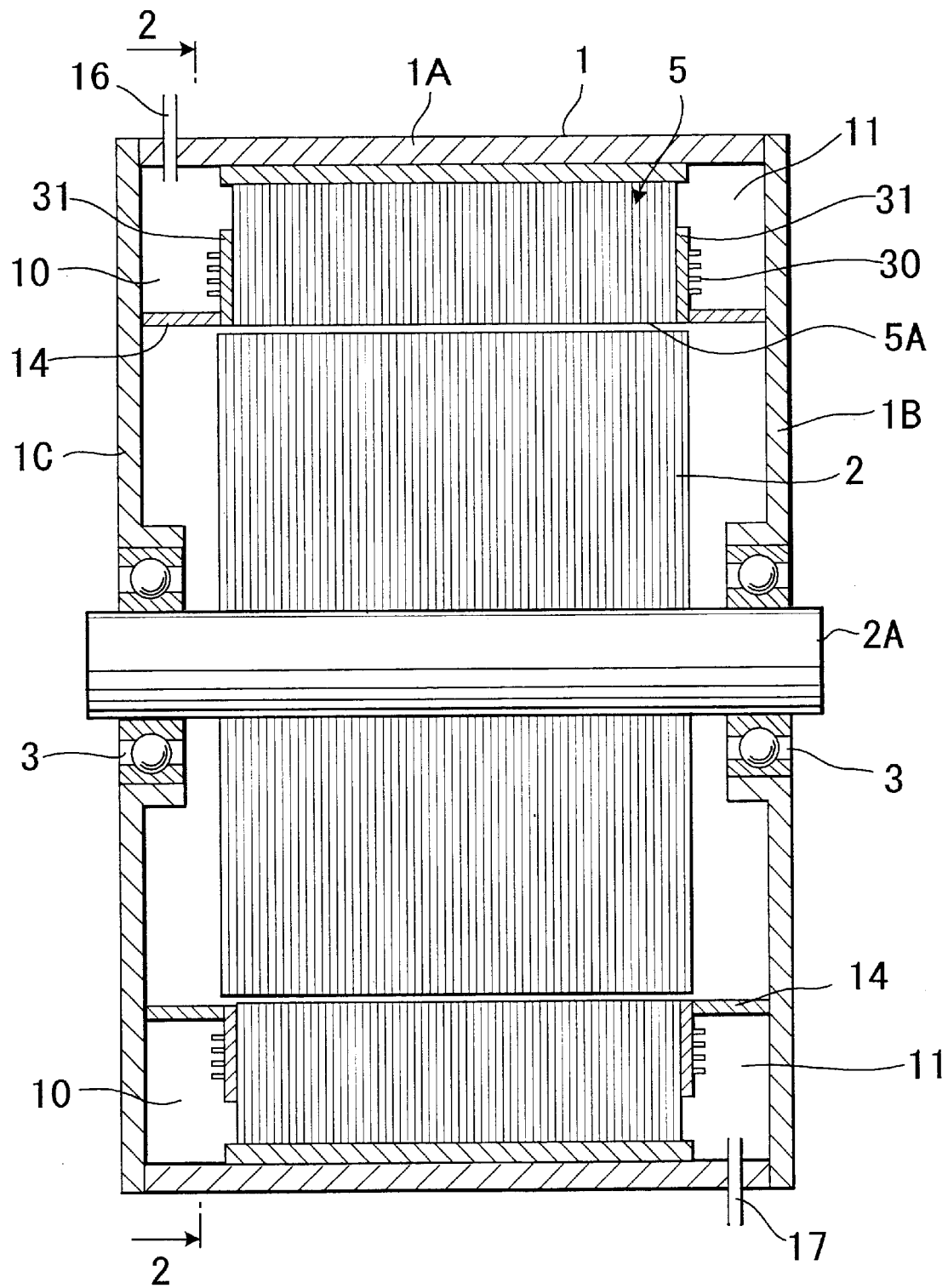
FIG. 1 is a sectional lateral view showing a rotating electric machine according to a first embodiment of this invention.

Referring to FIG. 1, a case 1 for a rotating electric machine comprises a cylindrical plate 1A, and lateral plates 1B, 1C which cover an opening on both axial ends of the cylindrical plate 1A.

A columnar rotor 2 is housed in the case 1. Both ends of the rotation shaft 2A of the rotor 2 are supported on lateral plates 1B, 1C through respective bearings 3. The rotor 2 rotates freely about the rotation shaft 2A.

A cylindrical stator 5 is housed in the case 1 and is disposed to come into contact with the inner peripheral surface of the cylindrical plate 1A and to encircle the outer periphery of the rotor 2. The inner peripheral surface 5A of the cylindrical stator 5 is substantially parallel to the outer periphery of the rotor 2. A fixed space (for example about 1 mm) is provided between the outer peripheral surface of the rotor 2 and the inner peripheral surface 5A of the stator 5.

The stator 5 comprises a stator core 20, coils 30 which are wound on the teeth 23 of the stator core 20, slots 25 which are the indentations between adjacent teeth 23, and end plates 31 which are attached on both end faces of the stator core 20. The end plates 31 cover the teeth 23 of the stator core 20.

A first cooling jacket 10 comprising a ring-shaped space is formed between one axial end face of the stator 5 and the inner surface of the lateral plate 1C. A second cooling jacket 11 comprising a ring-shaped space is formed between one axial end face of the stator 5 and the inner surface of the lateral plate 1B. Cooling oil is supplied to the first cooling jacket 10 through an oil supply mouth 16 which passes through the cylindrical plate 1A.

Figure 2:
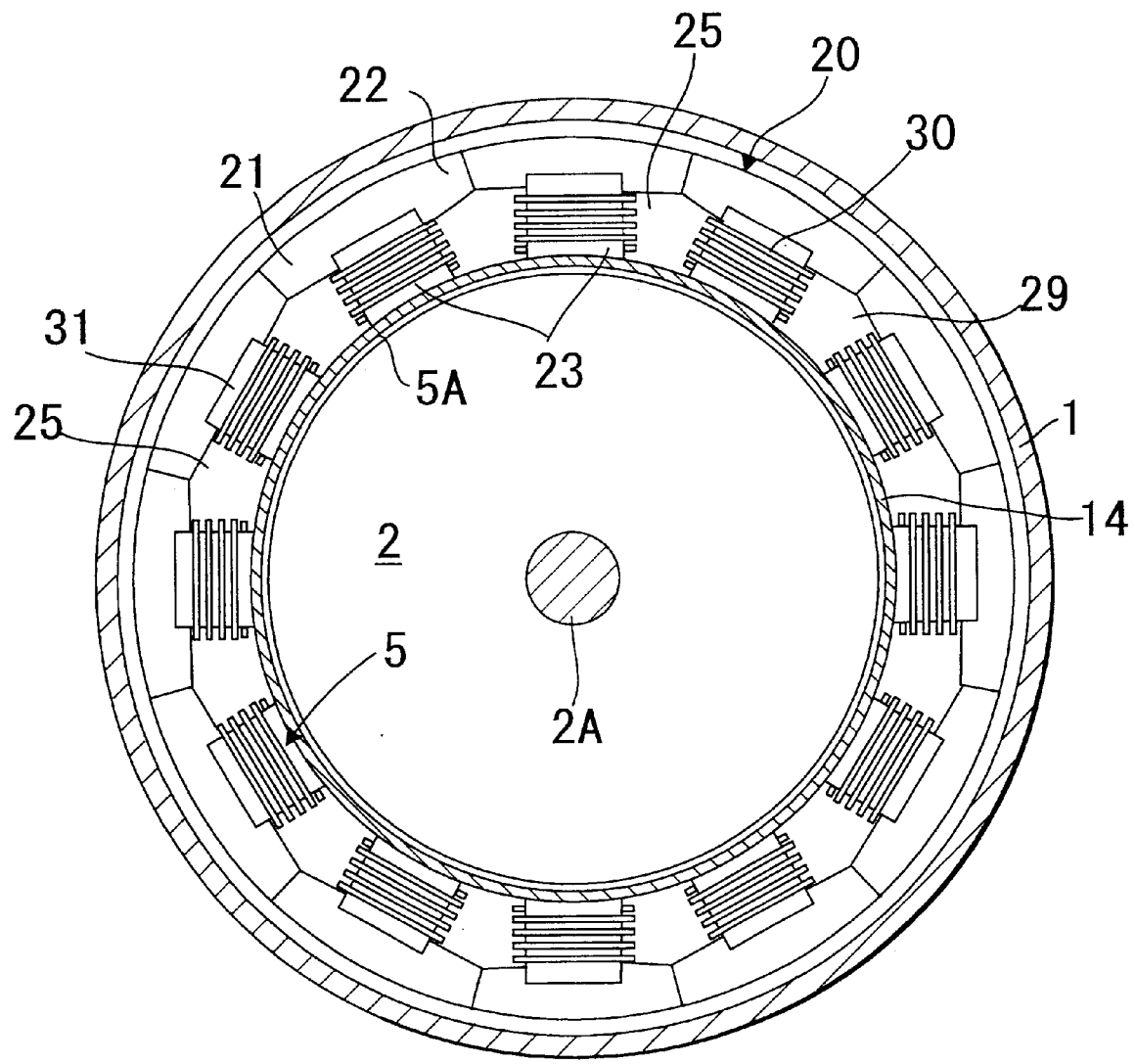
FIG. 2 is a sectional view along the line 2—2 in FIG. 1.

The cooling oil passes through the cooling passage 29 shown in FIG. 2 which is formed in the stator 5, and is introduced into the second cooling jacket 11 on the opposite side to the first cooling jacket 10. The cooling oil is discharged to the outside from the second cooling jacket 11 through an oil discharge mouth 17 which passes through the cylindrical plate 1A.

As shown in FIG. 2, the stator 5 is provided with a stator core 20 and coils 30 wound on the stator core 20.

The stator core 20 has a divided core structure where a fixed number of divided cores 21 are connected in the form of a ring. In other words, the stator core 20 comprises a plurality of core components connected together into a circumferential array. However, this invention is also applicable to a single-piece stator core which is not divided along circumferential direction.

The fixed number of connected cores in this embodiment is twelve. Each divided core 21 includes a fixed number of substantially T-shaped magnetic steel plates which are laminated together in the direction of the rotation shaft 2A of the rotor 2. The fixed number is determined by the thickness of the T-shaped magnetic steel plate and the required size of the stator core 20. In FIG. 2, the direction of the rotation shaft 2A of the rotor 2 is perpendicular to the surface of the page.

Figure 3:
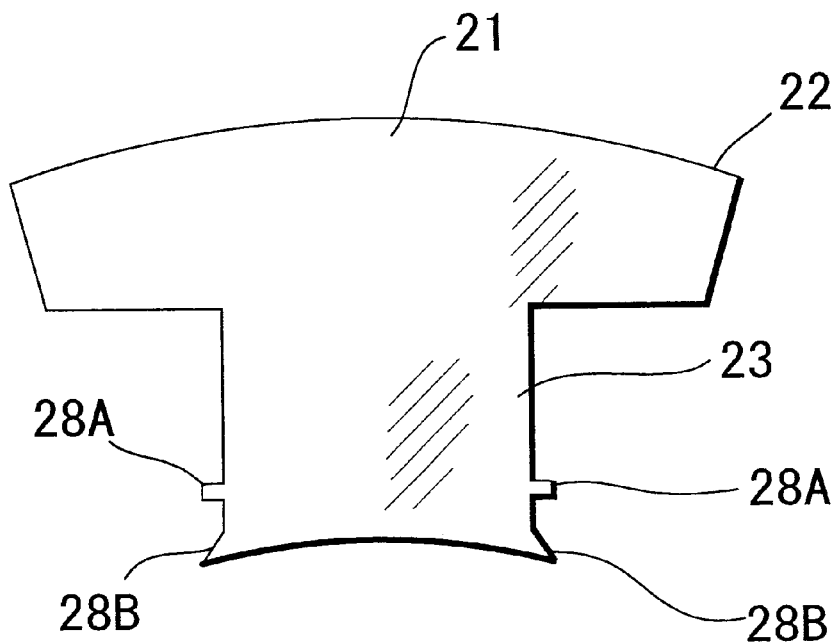
FIG. 3 is a front view of a divided core.

The stator core 20 comprising divided cores 21 is provided with ring-shaped back core sections 22 along the inner peripheral surface of the cylindrical plate 1A of the case 1 and teeth 23 projecting in a radial direction of the stator core 20 from the back core sections 22 (refer to FIG. 3).

The indentation between adjacent teeth 23 forms a slot 25. The coils 30 are wound with concentrated windings onto each of the teeth 23 and are housed in the slot 25.

Figure 7:
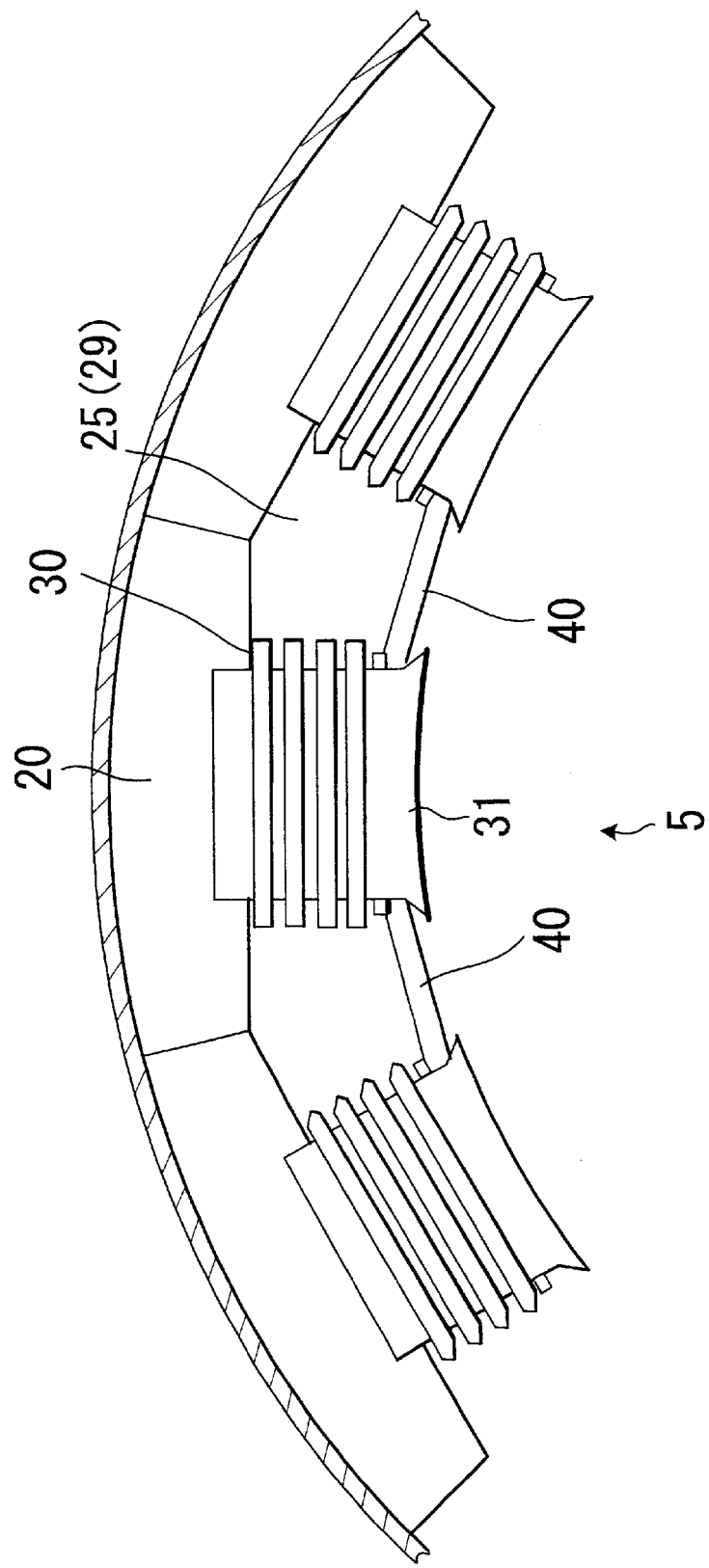
FIG. 7 is a partial sectional view of stator core with closing plates.

A closing plate 40 is fitted to the slot opening 27 facing the outer periphery of the rotor 2, thereby enabling the slot 25 to act as a cooling passage 29 which allows flow of cooling oil from the cooling jacket 10 (refer to FIG. 7). A closing plate 40 is provided on both side faces near the tip of the teeth 23 and is inserted and retained between projections 28A and 28B extending in the direction of the rotation shaft.

A resin layer 50 covers the closing plate 40 and is formed on the outer side of the closing plate 40 in order to create a tight seal in the cooling passage 29. The resin layer 50 is made from resinous material so that the surface on the rotor side is coplanar with the inner peripheral surface 5A of the stator 5.

A cylindrical member 14 is formed from both ends of the stator 5 on the extension of the inner peripheral surface 5A of the stator 5 in order to form a first cooling jacket 10 and a second cooling jacket 11. The cylindrical member 14 reaches the lateral plates 1B, 1C of the case 1. The cylindrical member 14, both ends of the stator 5, the lateral plates 1B, 1C, and the inner periphery of the cylindrical plate 1A of the case 1 define two ring-shaped spaces.

The cylindrical member 14 is integrated with the stator 5 by resin molding. This prevents leakage of cooling oil by increasing the sealing characteristics of the contact faces of the cylindrical member 14 and the stator 5 (namely the end plate 31).

This structure will be described in detail referring to FIG. 3 to FIG. 10.

Figure 4:
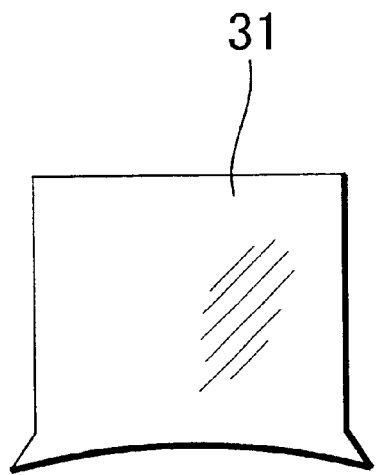
FIG. 4 is a front view of an end plate.
Figure 5A:
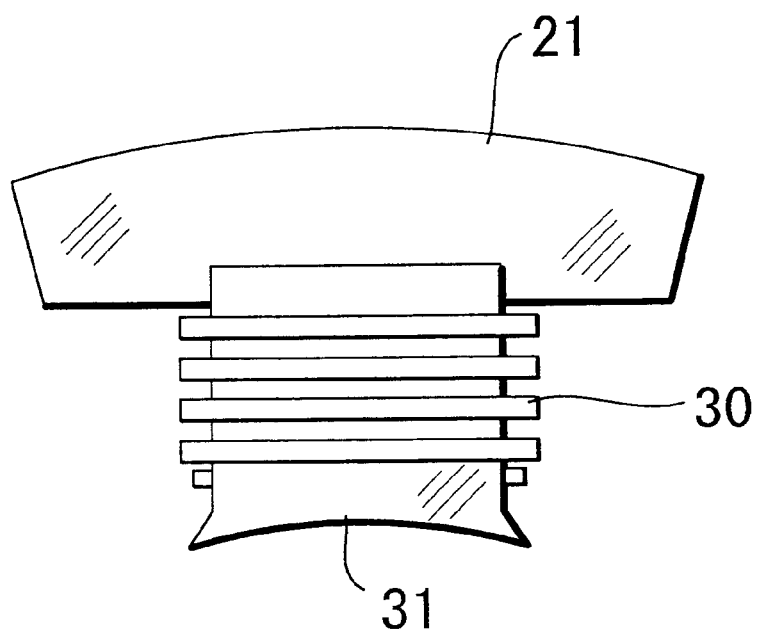
FIG. 5A is a front view and FIG. 5B is a lateral view.
Figure 5B:
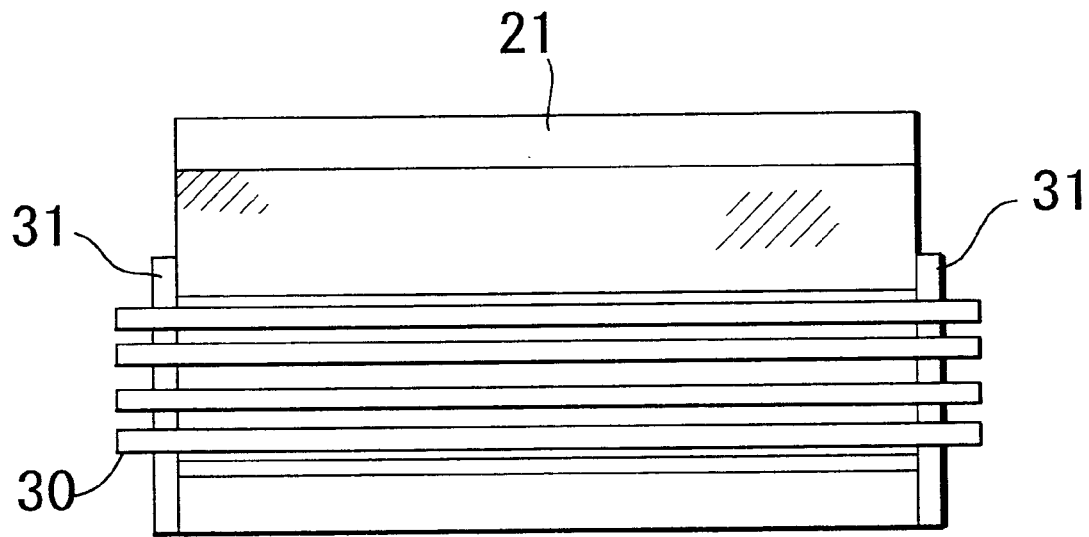

Referring to FIG. 4, the end plate 31 has a substantially similar shape as the teeth 23 of the stator core 20, and specifically has the same width as the teeth 23. Referring to FIGS. 5A and 5B, the end plate 31 is disposed in close attachment to both axial ends of the divided core 21. The end plate 31 is sandwiched between the divided core 21 and the coil 30 wound on the divided core 21. In this manner, the end plate 31 is integrated with the divided core 21 (namely stator core 20) which comprises laminated magnetic steel plates.

Figure 6:
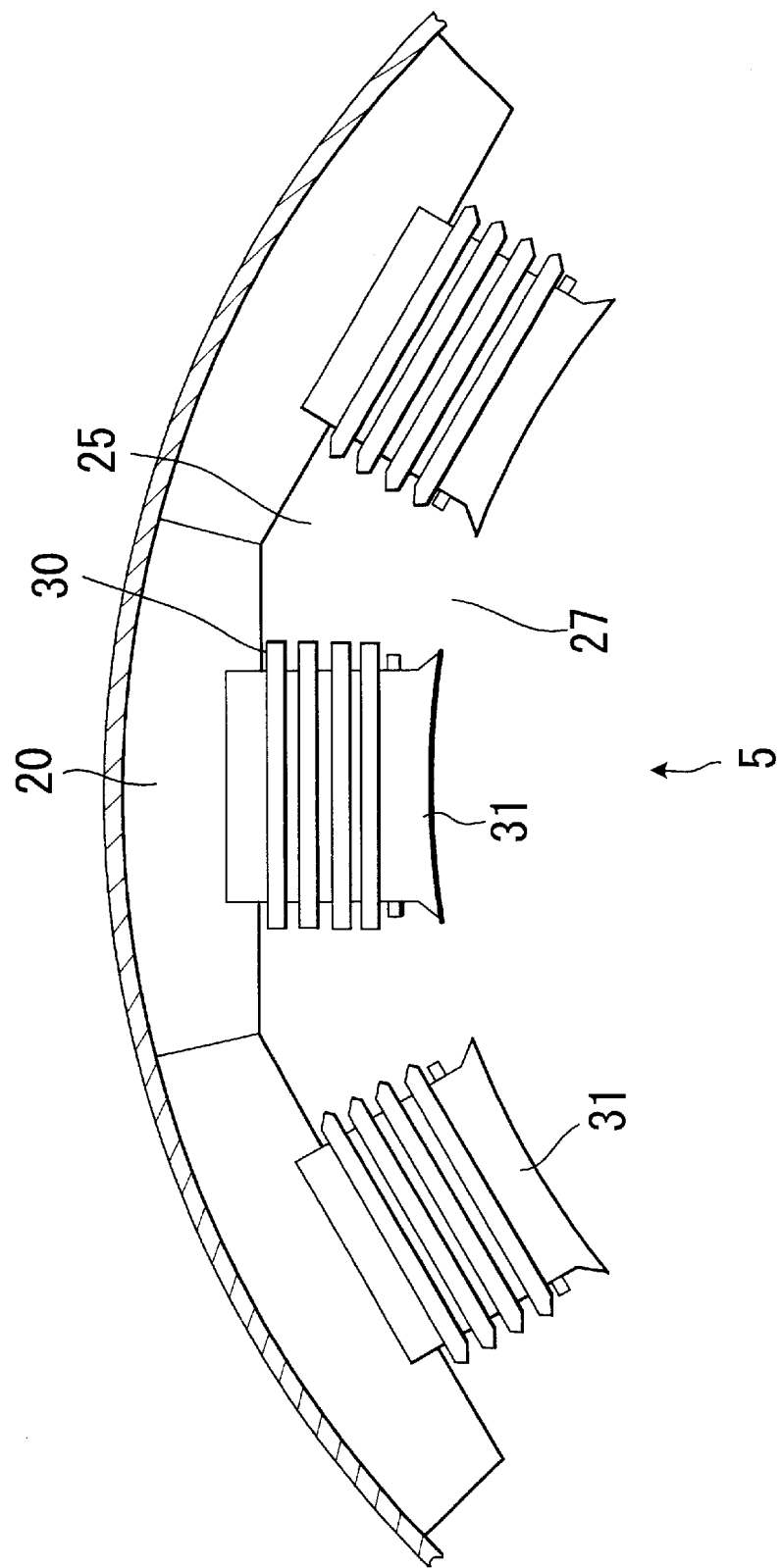
FIG. 6 is a partial sectional view of a stator core housed in a case.

Referring now to FIG. 6 and FIG. 7, the above closing plate 40 is fitted to both sides of each of the teeth 23 of the stator core 20 on which coils 30 are wound in the manner described above. The closing plate 40 closes the slot opening 27.

Figure 8A:
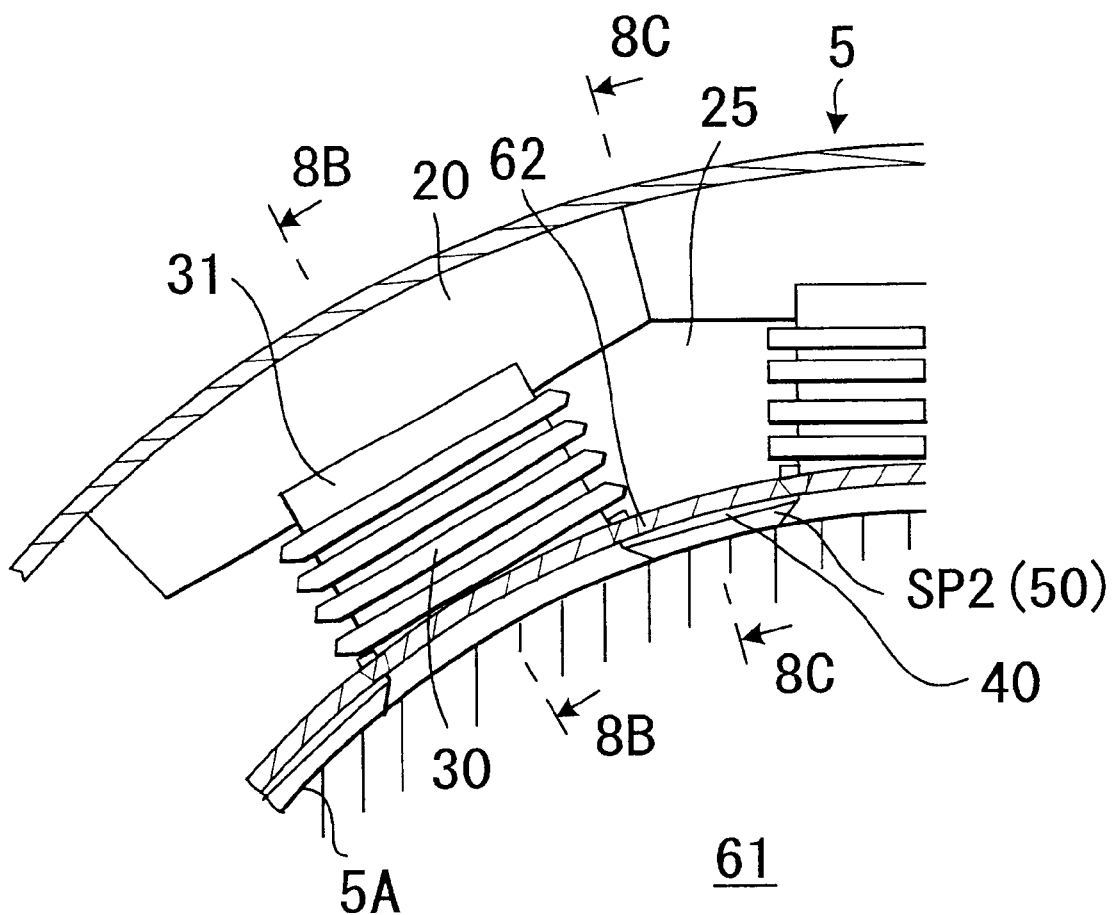
FIG. 8A is a sectional front view.
Figure 8B:
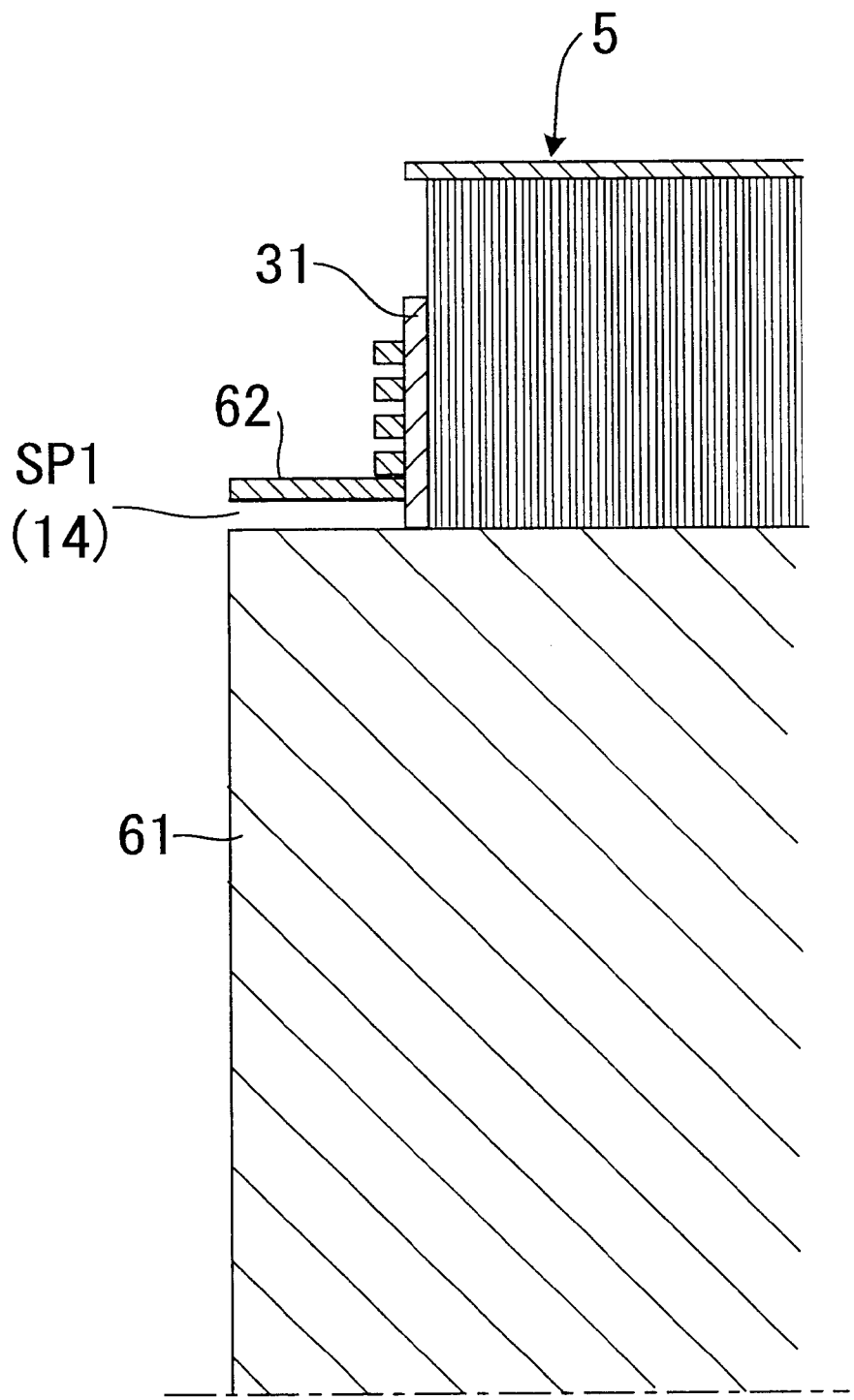
FIG. 8B is a sectional lateral view along the line 8B—8B in FIG. 8A.
Figure 8C:
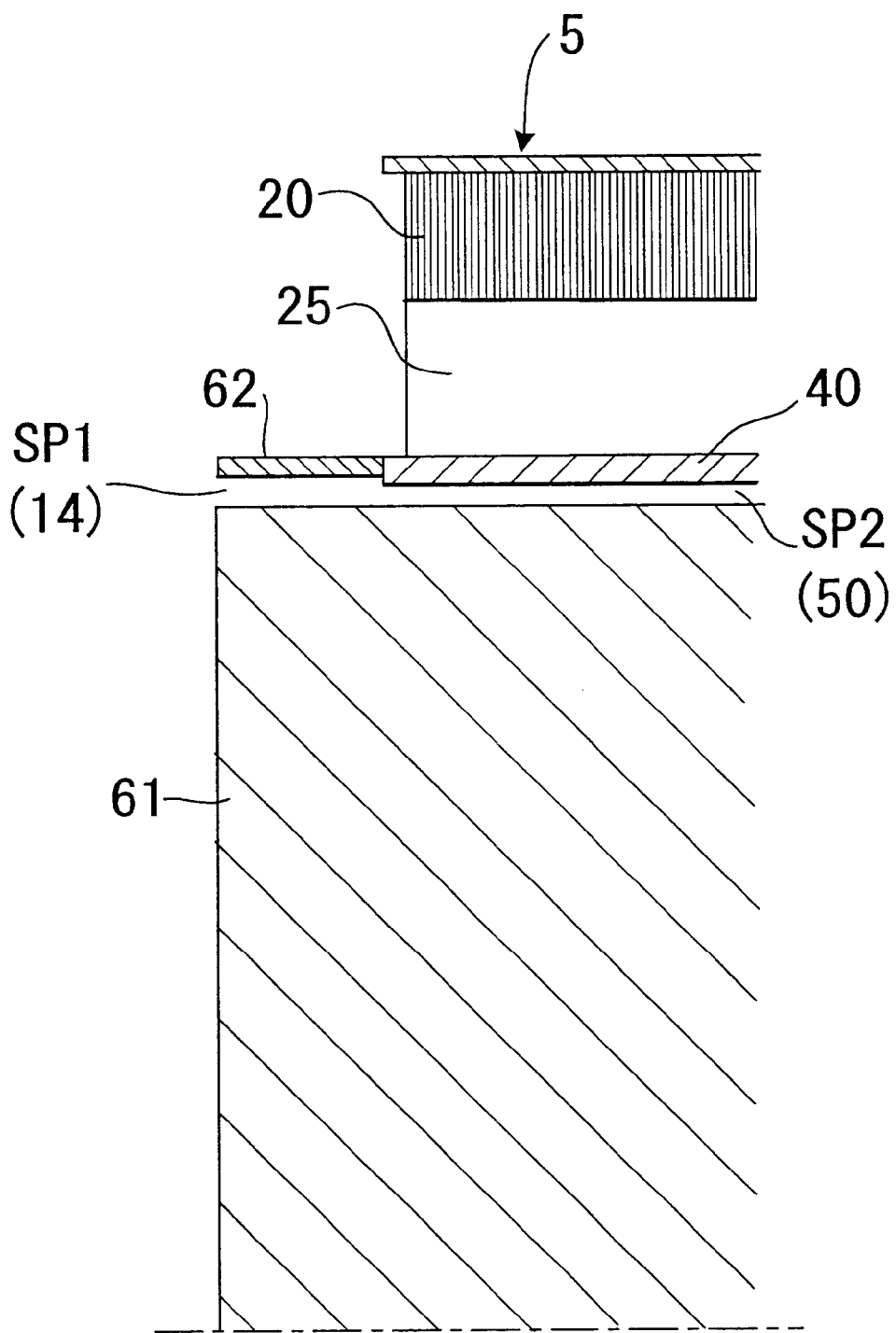
FIG. 8C is a sectional lateral view along the line 8C—8C in FIG. 8A.

Next referring to FIGS. 8A–8C, during the manufacturing of the cylindrical member 14, an inner columnar mold 61 and an outer cylindrical mold 62 is provided so as to form a cylindrical member 14. The inner columnar mold 61 is disposed making close contact with the inner peripheral surface 5A of the stator 5. The outer cylindrical mold 62 is positioned on an outer side of the inner mold 61 on both ends of the stator 5. A fixed gap corresponding to the thickness of the cylindrical member 14 is created between the inner mold 61 and the outer mold 62.

The inner and outer molds 61, 62 partition a cylindrical space SP1, as shown in FIG. 8B. At the same time, the outer cylindrical mold 62 comes into contact with the closing plates 40, and is superimposed with the closing plates 40 which are disposed at the slot openings 27, as shown in FIG. 8A. As shown in FIGS. 8A and 8C, a space SP2 between the closing plate 40 and the inner mold 61 extends in the direction of the rotation shaft while communicating with the cylindrical space SP1 on the inner side of the outer mold 62.

Figure 9A:
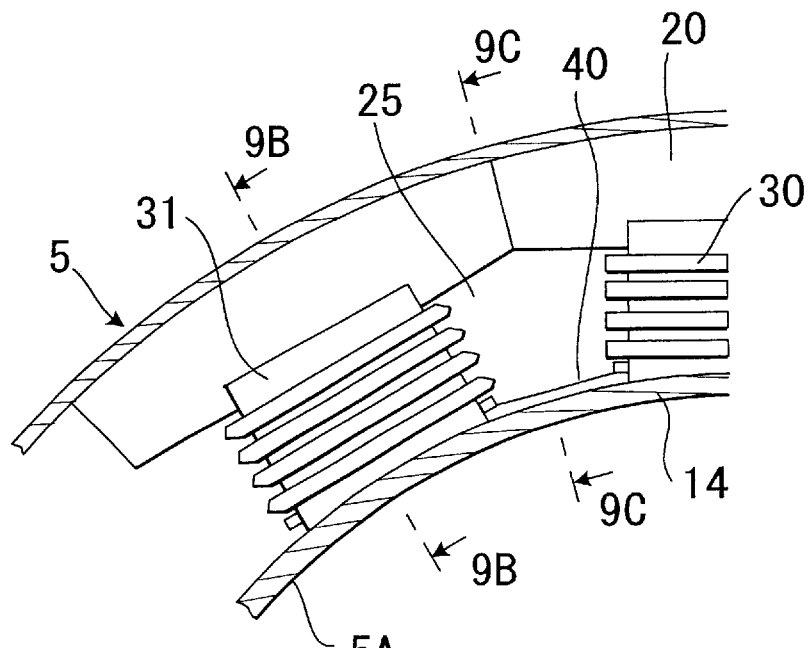
FIG. 9A is a sectional front view.
Figure 9B:
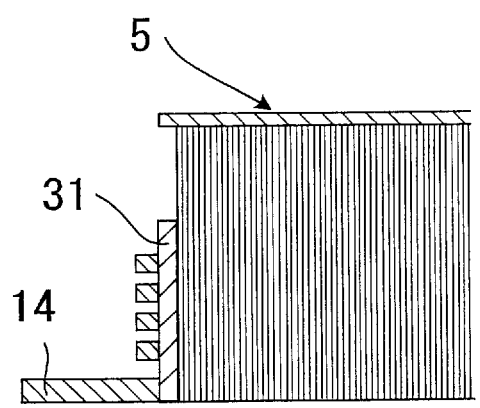
FIG. 9B is a sectional lateral view along the line 9B—9B in FIG. 9A.
Figure 9C:
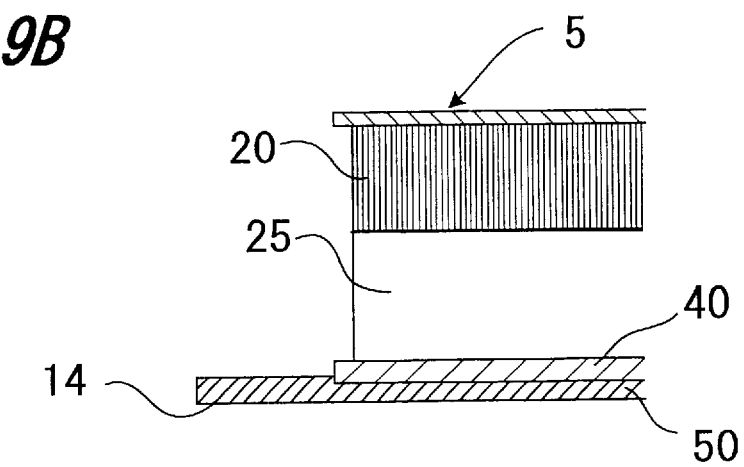
FIG. 9C is a sectional lateral view along the line 9C—9C in FIG. 9A.

Resinous material is introduced into the spaces SP1, SP2 formed by the inner mold 61 and the outer mold 62 set in the configuration above. Thus as shown in FIGS. 9A–9C, a cylindrical member 14 is formed on both end faces of the stator 5, and the resinous layer 50 whose peripheral surface coincides with the inner peripheral surface 5A of the stator 5, is formed on the slot opening 27. The cylindrical member 14 and the resinous layer 50 are mutually integrated by resin molding (refer to FIG. 9C). Though, in this embodiment, the cylindrical member 14 and the resinous layer 50 are molded in one piece, they may be formed as different pieces by being separately molded.

The end plate 31 is formed from an electrically non-conducting material (namely an insulator) having superior sealing characteristics with the resinous material of the cylindrical member 14 to the magnetic steel plates which constitute the stator core 20. This is in order to improve the sealing characteristics of the contact faces of the cylindrical member 14 and the end plates 31. The end plate 31 may be formed from the same resinous material as that constituting the cylindrical member 14.

Figure 10A:
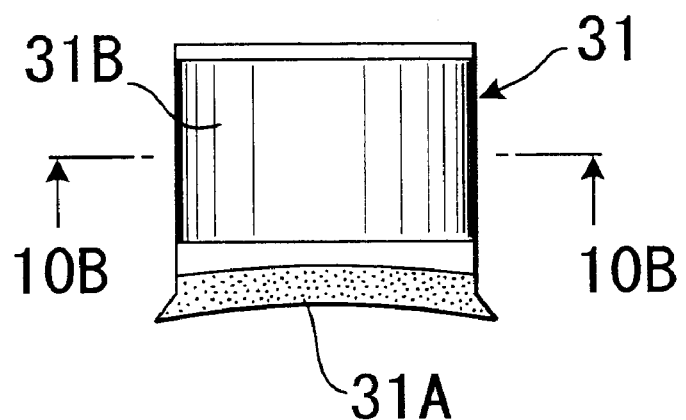
FIG. 10A is a front view and FIG. 10B is a sectional view along the line 10B—10B in FIG. 10A.

Referring to FIG. 10A, the finish on the surface of the area which is in contact with the cylindrical member 14 is adapted to be coarser than other regions. That is to say, a coarse face 31A is formed in the area which makes contact with the cylindrical member 14. In this manner, the sealing characteristics of the end plate 31 with the resinous material forming the cylindrical member 14 are further improved. The coarse face 31A does not extend to the area where the end face of the outer mold 62 makes contact with the end plate 31 in order to maintain good contact between the end plate 31 and the outer mold 62 during molding operations.

Thus a cylindrical member 14 is bonded with superior sealing characteristics to the end plate 31 at both ends of the stator. Furthermore the inner peripheral surface of the cylindrical member 14 extends from both ends of the stator 5 to coincide with the inner peripheral surface 5A of the stator 5. The cylindrical member 14 along the inner peripheral surface 5A of the stator 5 is integrated with the resinous layer 50 which closes the slot opening 27.

In the above manner, in addition to the sealing characteristics of the cooling passage 29 formed along the slot 25, the sealing characteristics of the cooling jackets 10, 11 formed from the inner periphery of the case 1 both ends of the stator 5 (end plates 31) and the outer periphery of the cylindrical member 14 are improved.

In this embodiment, cooling oil for the stator 5 which flows along both cooling jackets 10, 11 and the cooling passage 29 connected therebetween can be prevented from leaking from between the contact faces of the end plate 31 with the cylindrical member 14, the contact faces of the stator core 20 with the end plate 31 and the contact faces of the resinous layer 50 with the stator core 20.

Figure 10B:
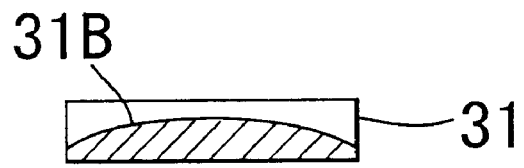

Referring to FIG. 10B, it is possible to avoid damage to the coil windings when the coils 30 are wound onto the stator 5. This can be achieved by forming a curved part 31B in the end plate 31. On the curved part 31B, the coil 30 is wound.

Figure 11:
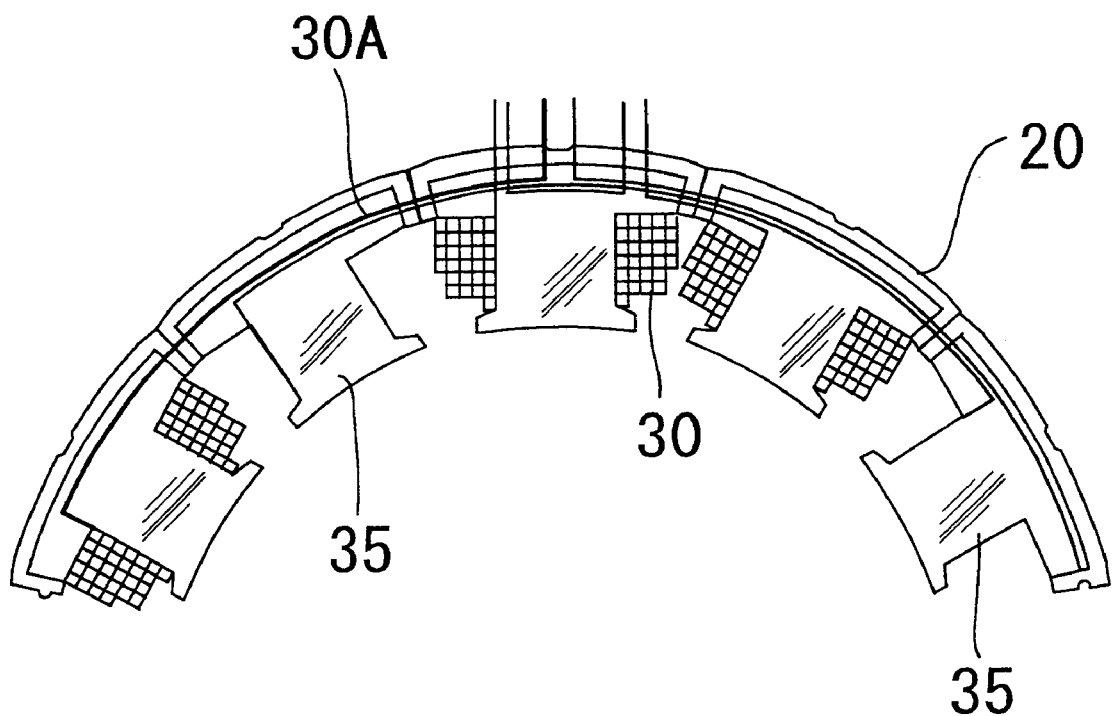
FIG. 11 is a front view of a stator including an end plate according to a second embodiment of this invention.

A second embodiment of this invention will be described hereafter referring to FIG. 11 and FIG. 12. This embodiment differs from the first embodiment with respect to the shape of the end plate.

In the second embodiment, a T-shaped end plate 35 is formed so that the shape of the end plate 35 which is disposed on both ends of the stator core 20 substantially coincides with the shape of the divided core 21 (core component). A plurality of end plates substantially cover the whole end of the stator core 20.

In this manner, a wire cross over section 30A between the coils 30 avoids direct contact with the end face of the stator core 20 and thus avoids damage to the wire as a result.

Figure 12A:
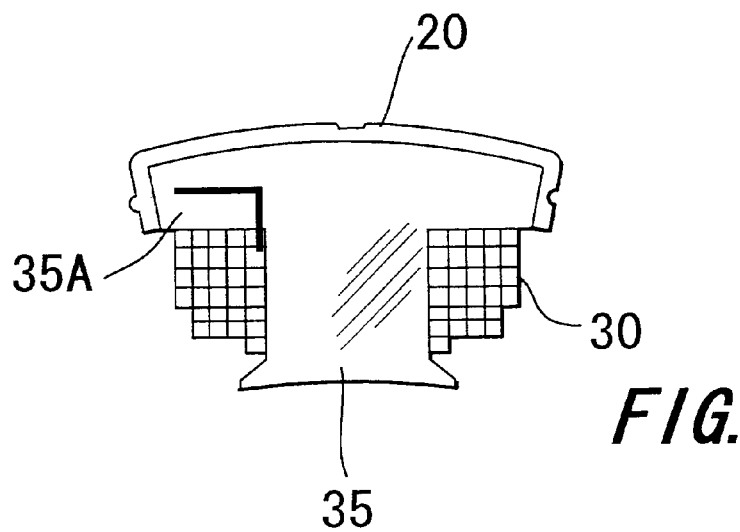
FIG. 12A is a front view (shown together with a stator core and a coil)
Figure 12B:
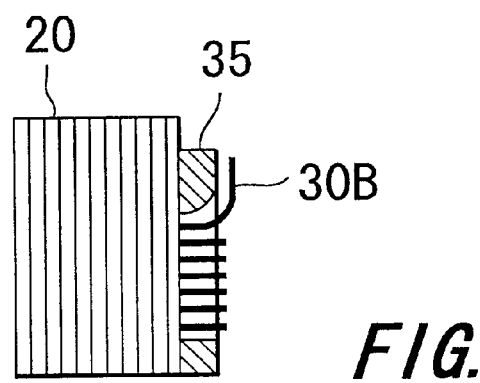
FIG. 12B is a sectional lateral view (shown together with a stator core and a coil)
Figure 12C:
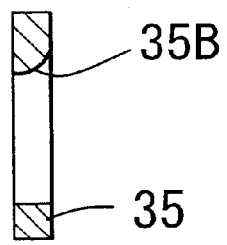
FIG. 12C is a sectional lateral view.

Referring to FIGS. 12A–12C, avoiding damage to the lead wire section 30B of the coils 30 is enabled by forming a curved section 35B. The curved section 35B leads the lead wire section 30B of the coils 30 onto one shoulder 35A of the end plate 35.

Next a third embodiment of this invention will be described referring to FIG. 13 and FIG. 14. This embodiment differs from the first embodiment with reference to the shape of the end plate. However in other respect, this embodiment is the same as the first embodiment.

Figure 13:
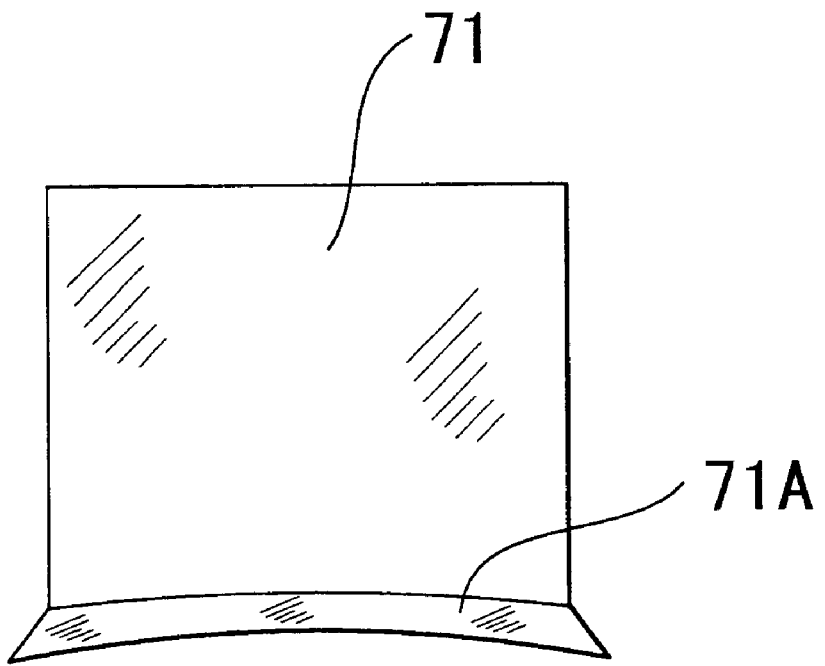
FIG. 13 is a front view of an end plate according to a third embodiment of this invention.
Figure 14A:
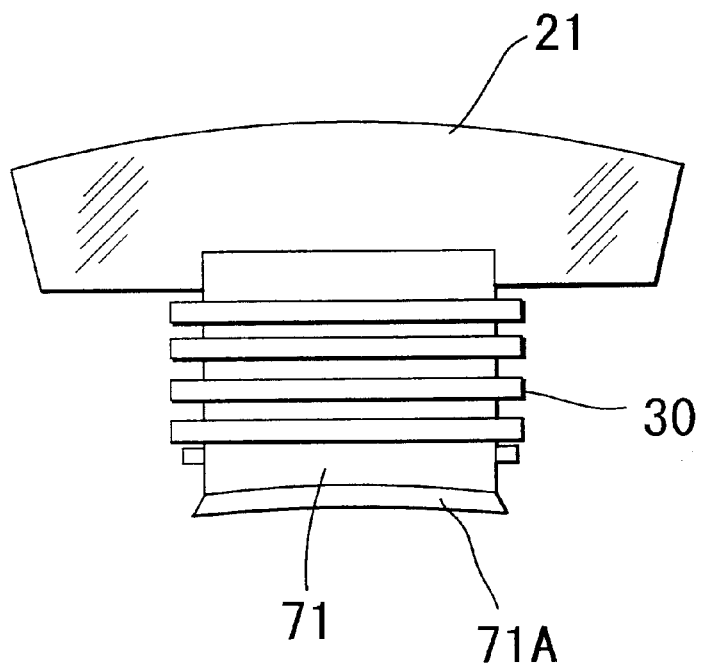
FIG. 14A is a front view and FIG. 14B is a lateral view.
Figure 14B:
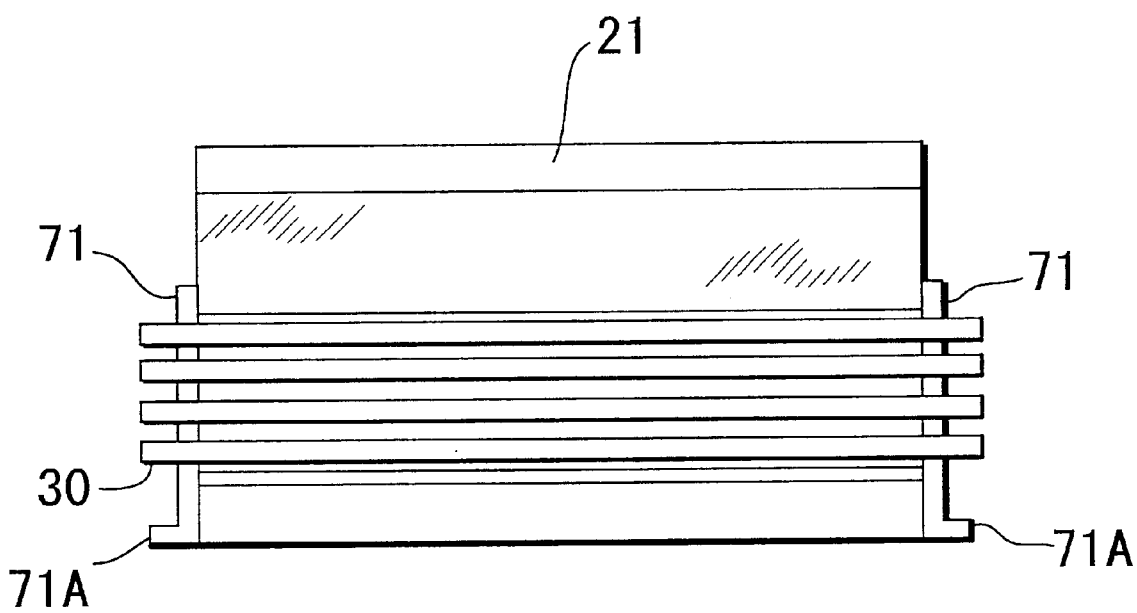

In the third embodiment, a step 71A is formed on an end face of the end plate 71 as an engaging section extending in parallel along the inner periphery 5A of the stator 5, as shown by FIG. 13, FIGS. 14A and 14B. The step 71A engages with the cylindrical member 14.

The step 71A increases the bonding of the end plate 71 with the resinous material constituting the resin-molded cylindrical member 14.

Figure 15A:
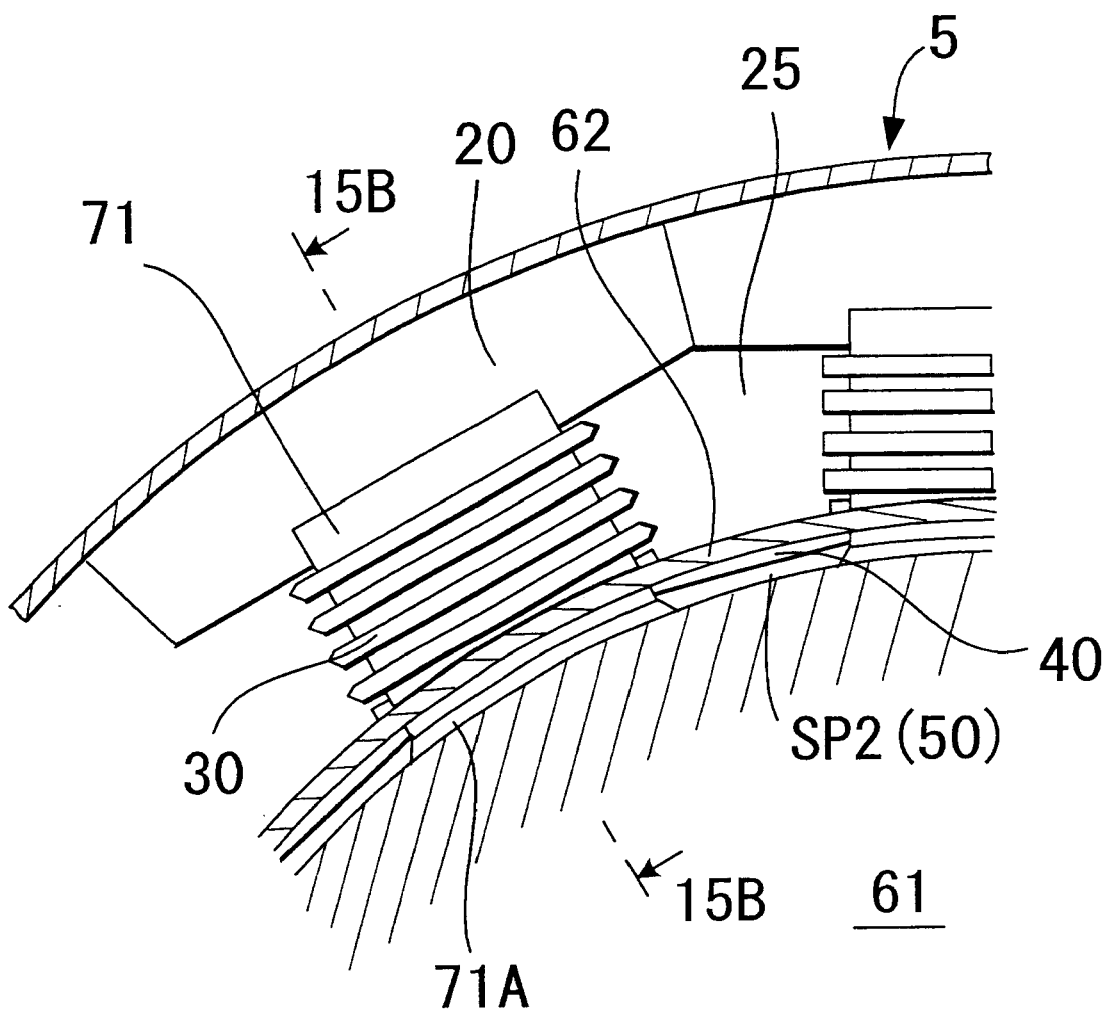
FIG. 15A is a sectional front view and FIG. 15B is a sectional lateral view along the line 15B—15B in FIG. 15A.
Figure 15B:
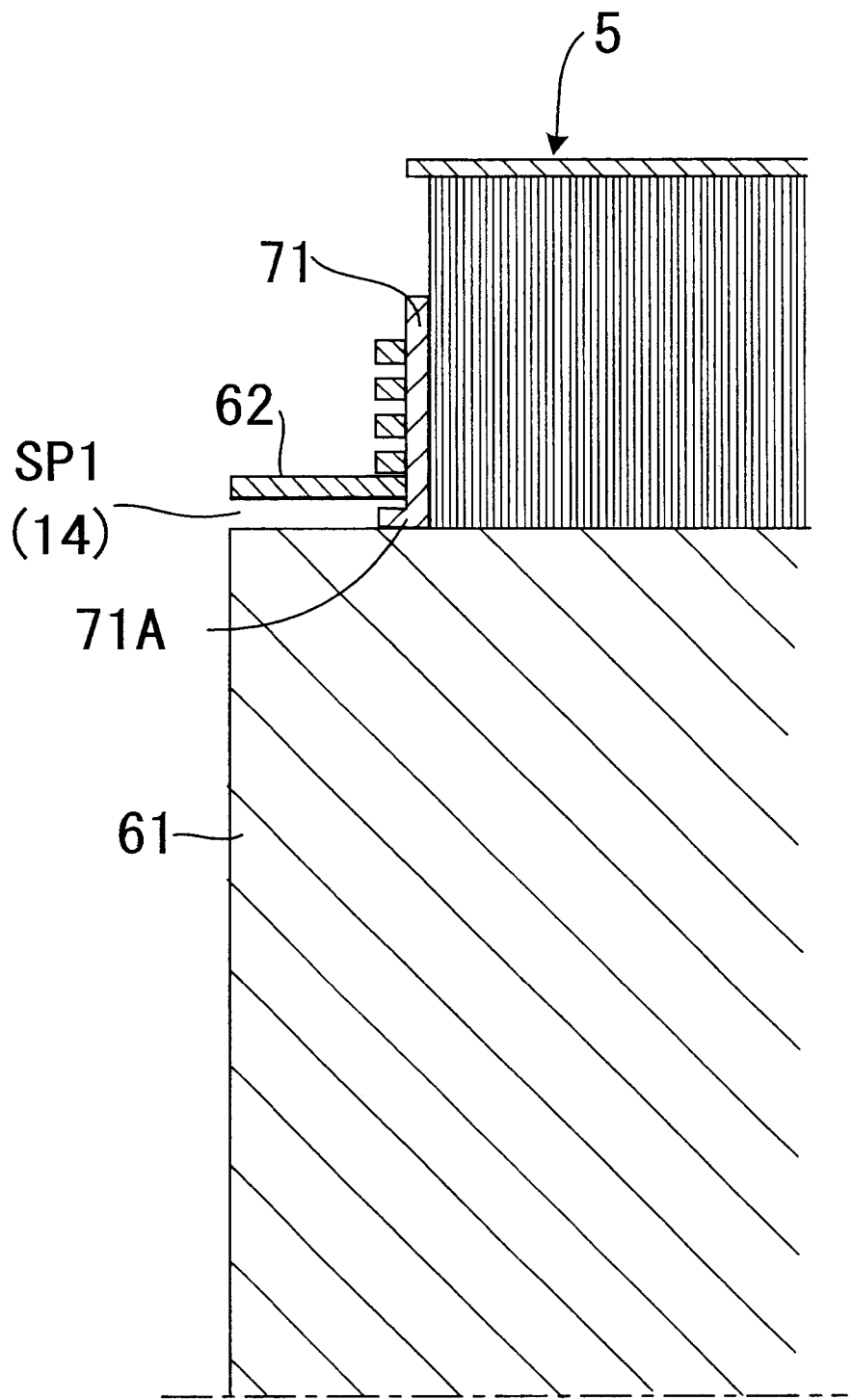

Referring to FIGS. 15A and 15B, during the manufacturing of the cylindrical member 14, a columnar inner mold 61 is disposed in tight attachment with the inner periphery of the stator 5 in the same manner as the first embodiment and a cylindrical outer mold 62 is disposed on an outer side of the inner mold 61 at both ends of the stator 5. A cylindrical space SP1 is partitioned by creating a fixed gap between the molds 61 and 62. A resinous material is introduced to fill the space formed by the molds 61, 62.

Figure 16A:
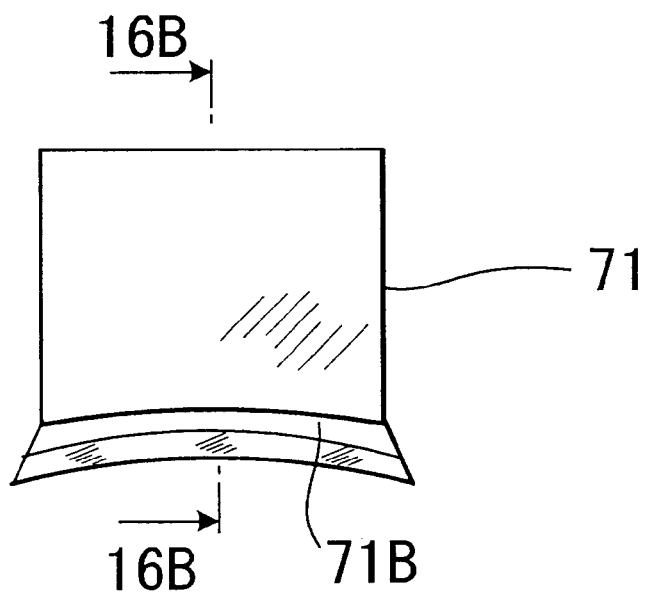
FIG. 16A is a front view and FIG. 16B is a sectional lateral view along the line 16B—16B in FIG. 16A.
Figure 16B:
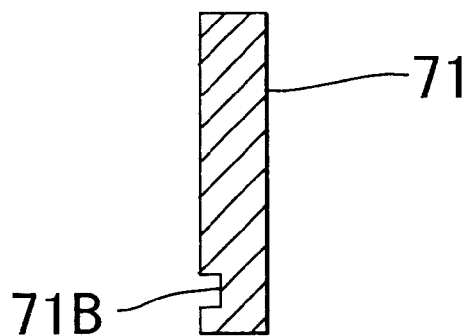

A fourth embodiment of this invention will be described below referring to FIGS. 16A and 16B. This embodiment differs from the third embodiment above with reference to the shape of the engaging section of the end plate 71. However in other respect, this embodiment is the same as the third embodiment.

A groove 71B which extends in parallel along the inner periphery 5A of the stator 5 is formed instead of the step 71A on the end plate 71. Resinous material is introduced to form a cylindrical member 14 in the groove 71B. Thus it is possible to prevent detachment of the cylindrical member 14 from the end plate 31 as a result of stress acting on the contact face of the cylindrical member 14 and the end plate 31.

Although the invention has been described above by reference to certain embodiments of the invention, the invention is not limited to the embodiments described above.

The entire contents of Japanese Patent Applications P2001-71555 (filed Mar. 14, 2001) and P2001-187588 (filed Jun. 21, 2001) are incorporated herein by reference.

Modifications and variations of the embodiments described above will occur to those skilled in the art, in light of the above teachings. The scope of the invention is defined with reference to the following claims.

What is claimed is:

1. A rotating electric machine comprising:

a rotor;

a stator including a stator core having teeth, a coil being wound around each of the teeth, a slot formed between adjacent teeth, and an end plate being disposed on the end of the stator core and made from a material which is different from the magnetic material constituting the stator core; the end plate being integrally joined with the stator core by winding the coil through the outer side of the end plate;

a case for housing the rotor and the stator; and a cylindrical member which projects along the inner peripheral surface of the stator from the end plate; the cylindrical member being formed by a resinous material to be integrated with a section of the end plate;

wherein a cooling passage is formed in the slot by a closing plate for closing the slot opening and a ring-shaped space for introducing a cooling medium is defined by the outer peripheral side of the cylindrical member, an end face of the stator, and the case; the ring-shaped space being connected to the cooling passage.

2. The rotating electric machine as defined in claim 1, wherein the cylindrical member is integrally connected with a resin layer which covers the closing plate on the slot opening.

3. The rotating electric machine as defined in claim 1, wherein the end plate is formed from a non-conducting material which displays higher sealing characteristics with the resinous material than the magnetic material constituting the stator core.

4. The rotating electric machine as defined in claim 1, wherein the contact surface of the end plate with the cylindrical member is coarser than other surfaces of the end plate.

5. The rotating electric machine as defined in claim 1, wherein the end plate comprises an engagement section for engaging the end plate with the cylindrical member, the engagement section taking a ring shape and lying along substantially the inner peripheral surface of the stator.

6. The rotating electric machine as defined in claim 5, wherein the engagement section comprises a step which is formed substantially along the inner peripheral surface of the stator on the end plate.

7. The rotating electric machine as defined in claim 5, wherein the engagement section comprises a groove which is formed substantially along the inner peripheral surface of the stator on the end plate.

8. The rotating electric machine as defined in claim 1, wherein the section through which the coil is wound on the end plate is formed as a curved surface.

9. The rotating electric machine as defined in claim 1, wherein the stator core comprises a plurality of core components connected with one another, the end plate being formed in substantially the same shape as the core component, and the plurality of end plates substantially covering the whole end of the stator core.

10. The rotating electric machine as defined in claim 1, wherein the stator core comprises a plurality of core components connected with one another, the end plate being formed in substantially the same shape as the core component and having a curved section on which the lead wire section of the coil passes through, and the plurality of end plates substantially covering the whole end of the stator core.

* * * * *